US011603193B2

(12) United States Patent
Kim et al.

(10) Patent No.: US 11,603,193 B2
(45) Date of Patent: Mar. 14, 2023

(54) AIRCRAFT CONVERTIBLE BETWEEN FIXED-WING AND HOVERING ORIENTATIONS

(71) Applicants: Donghyun Kim, Cambridge, MA (US); Heng Yang, Cambridge, MA (US)

(72) Inventors: Donghyun Kim, Cambridge, MA (US); Heng Yang, Cambridge, MA (US)

(73) Assignee: Donghyun Kim, Cambridge, MA (US)

( * ) Notice: Subject to any disclaimer, the term of this patent is extended or adjusted under 35 U.S.C. 154(b) by 523 days.

(21) Appl. No.: 16/505,445

(22) Filed: Jul. 8, 2019

(65) Prior Publication Data

US 2020/0062383 A1 Feb. 27, 2020

Related U.S. Application Data

(60) Provisional application No. 62/698,806, filed on Jul. 16, 2018.

(51) Int. Cl.
*B64C 29/00* (2006.01)
*B64C 3/38* (2006.01)
(Continued)

(52) U.S. Cl.
CPC .......... *B64C 29/0033* (2013.01); *B64C 3/385* (2013.01); *B64C 13/38* (2013.01); *B64C 11/46* (2013.01)

(58) Field of Classification Search
CPC .. B64C 29/0016; B64C 29/0033; B64C 3/385
See application file for complete search history.

(56) References Cited

U.S. PATENT DOCUMENTS

| 3,035,789 A * | 5/1962 | Young | B64C 29/0033 244/7 C |
| 3,106,369 A * | 10/1963 | Borst | B64C 29/0033 244/7 R |

(Continued)

FOREIGN PATENT DOCUMENTS

| CN | 104044734 B | 3/2016 |
| CN | 108791818 A | 11/2018 |

(Continued)

OTHER PUBLICATIONS

Lesson 893—Selection of Electric Motors for Aerospace Application, Feb. 1, 1999, NASA-MSFC, [https://llis.nasa.gov/lesson/893] accessible prior to the effective filing date: [https://web.archive.org/web/201650523011725/https://llis.nasa.gov/lesson/893] (Year: 1999).*

(Continued)

*Primary Examiner* — Timothy D Collins
*Assistant Examiner* — Justin Michael Heston
(74) *Attorney, Agent, or Firm* — Caldwell Intellectual Property Law

(57) ABSTRACT

An aircraft convertible between fixed-wing and hovering orientations includes a fuselage. The aircraft includes a main wing pair comprising two opposing wings attached to the fuselage, where each wing of the two opposing wings includes a fixed wing section attached to the fuselage and a movable wing section rotatably mounted to the fixed wing section. The aircraft includes at least a first propulsor mounted to the movable wing section of each of the two opposing wings. The aircraft includes at least a first rotation mechanism attached to the fixed wing section and movable wing section of each of the two opposing wings, the at least a first rotation mechanism configured to rotate the movable wing section between a first movable wing section position (Continued)

parallel to the fixed wing section and a second movable wing section position perpendicular to the fixed wing section.

18 Claims, 9 Drawing Sheets

(51) Int. Cl.
*B64C 13/38* (2006.01)
*B64C 11/46* (2006.01)

(56) References Cited

U.S. PATENT DOCUMENTS

| | | | | |
|---|---|---|---|---|
| 3,197,157 | A * | 7/1965 | King | B64C 29/0033 |
| | | | | 244/7 C |
| 3,430,894 | A | 3/1969 | Levinsky et al. | |
| 3,666,209 | A | 5/1972 | Taylor | |
| 6,719,244 | B1 | 4/2004 | Gress | |
| 8,931,729 | B2 | 1/2015 | Abde Qader Alzu'bi et al. | |
| 9,493,235 | B2 * | 11/2016 | Zhou | B60F 5/02 |
| 2005/0230519 | A1 | 10/2005 | Hurley | |
| 2009/0256026 | A1 * | 10/2009 | Karem | B64C 27/08 |
| | | | | 244/99.2 |
| 2010/0193644 | A1 * | 8/2010 | Karem | B64C 27/28 |
| | | | | 244/7 R |
| 2012/0043413 | A1 * | 2/2012 | Smith | B64C 29/0033 |
| | | | | 244/12.4 |
| 2012/0234968 | A1 * | 9/2012 | Smith | B64D 17/64 |
| | | | | 244/12.3 |
| 2014/0008498 | A1 | 1/2014 | Reiter | |
| 2017/0144771 | A1 | 5/2017 | Lukaczyk et al. | |
| 2017/0203839 | A1 * | 7/2017 | Giannini | B64C 29/0033 |
| 2018/0057148 | A1 * | 3/2018 | Bosworth | B64C 3/385 |
| 2018/0086447 | A1 * | 3/2018 | Winston | B64D 27/12 |
| 2018/0086448 | A1 * | 3/2018 | Kroo | B64C 29/0033 |

FOREIGN PATENT DOCUMENTS

| | | | | |
|---|---|---|---|---|
| EP | 2551190 A1 * | 1/2013 | | B64C 3/54 |
| KR | 101125870 B1 * | 3/2012 | | B64C 3/385 |
| WO | WO-2017021391 A1 * | 2/2017 | | B64C 39/024 |
| WO | WO-2017158417 A1 * | 9/2017 | | B64C 11/28 |

OTHER PUBLICATIONS

Cetinsoy, et al.; Design and construction of a novel quad tilt-wing UAV; Elsevier; Retrieved on Apr. 30, 2019 from http://citeseerx.ist.psu.edu/viewdoc/download?doi=10.1.1.470.6644&rep=rep1&type=pdf; Mar. 12, 2012.

Muraoka et al., Quad tilt wing Vtol Uav: Aerodynamic characteristics and prototype flight test; AIAA infotech@aerospace conference, Apr. 6-9, 2009, Seattle, Washington; Retrieved on 4/30/3019 from: http://citeseerx.ist.psu.edu/viewdoc/download?doi=10.1.1.721.7699&rep=rep1&type=pdf.

Ten-Engine Electric Plane Completes Successful Flight Test; Retrieved on Apr. 30, 2019 from: https://www.nasa.gov/langley/ten-engine-electric-plane-completes-successful-fllght-test; Apr. 30, 2015.

Barnard Microsystems; Tilt wing unmanned aircraft; Apr. 30, 2019.

* cited by examiner

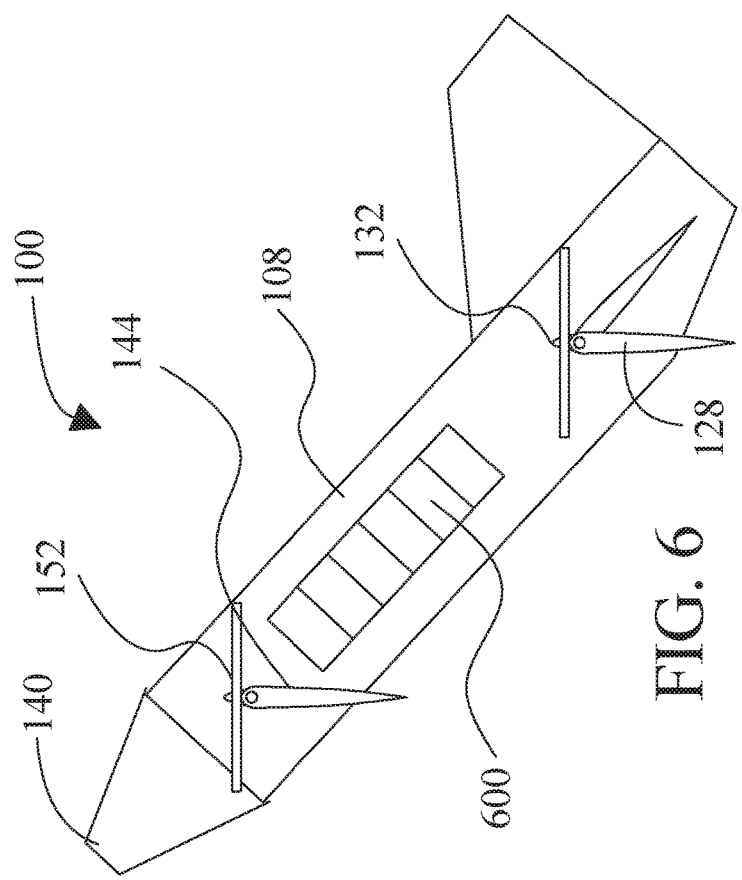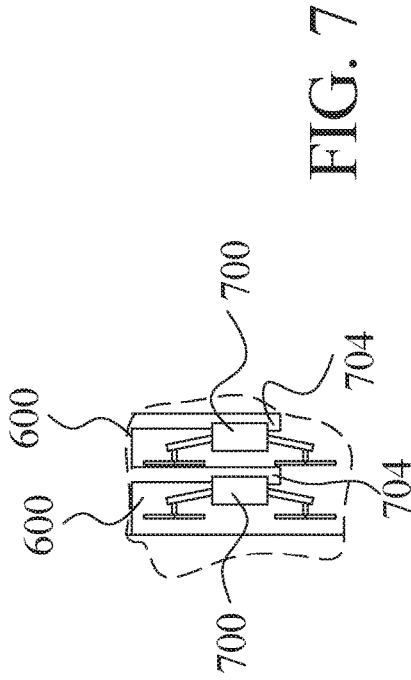

AIRCRAFT CONVERTIBLE BETWEEN FIXED-WING AND HOVERING ORIENTATIONS

RELATED APPLICATION DATA

This application claims the benefit of priority of U.S. Provisional Patent Application Ser. No. 62/698,806, filed on Jul. 16, 2018, and titled "Transformable Drone with Smart Transition between Fixed-wing and Quadcopter," which is incorporated by reference herein in its entirety.

FIELD OF THE INVENTION

The presented invention is directed to aircraft design. More specifically, the invention relates to an aircraft convertible between fixed-wing and hovering orientations.

BACKGROUND

Fixed-wing airplanes are popular in commercial air transportation and military, due to their high efficiency in payload capacity and long flight endurance. Quadcopters are well-known for their maneuverability, low cost and ease of control, thus popular for commercial and entertainment applications. Quadcopter can control the yaw of the aircraft using the differential angular momentum generated from a pair of propellers spinning in the same direction. The fixed wing aircraft cannot generate such angular momentum as quick as quadcopters can. On the other hand, fixed wing aircraft can take advantage of the lift surfaces from the wings, requiring no upward thrust from the engine during forward flight. This allows the fixed wing aircraft to have larger range of operations compared to the quadcopters. The quadcopter would always need to generate vertical thrust to keep the aircraft hovering at same altitude and additional variable force vectors to move the aircraft in other directions. Meanwhile, fixed-wing aircrafts require runway to take off and land. Therefore, neither quadcopter nor fixed-wing aircraft is a cost-effective way for applications like package delivery, emergency medicine delivery, long-range utility monitoring and aircraft regulation.

SUMMARY OF THE DISCLOSURE

In an aspect, an aircraft convertible between fixed-wing and hovering orientations includes a fuselage. The aircraft includes a main wing pair comprising two opposing wings attached to the fuselage, where each wing of the two opposing wings includes a fixed wing section attached to the fuselage and a movable wing section rotatably mounted to the fixed wing section. The aircraft includes at least a first propulsor mounted to the movable wing section of each of the two opposing wings. The aircraft includes at least a first rotation mechanism attached to the fixed wing section and movable wing section of each of the two opposing wings, the at least a first rotation mechanism configured to rotate the movable wing section between a first movable wing section position parallel to the fixed wing section and a second movable wing section position perpendicular to the fixed wing section.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 6 is a schematic diagram illustrating an exemplary embodiment of an aircraft with an angled fuselage and tilted wings;

FIG. 7 is a schematic diagram illustrating an exemplary embodiment of a storage compartment within the fuselage of a larger aircraft where smaller aircrafts in hovering form are able to be stored, deployed, and recaptured.

DETAILED DESCRIPTION

Disclosed embodiments include a mechanical design that incorporates both fixed-wing and hovering configurations, such as "quadcopter" configurations, and a flight control system design based on optimization methods. Disclosed embodiments may employ tilt wings to rotate the wings at different angles to transform between hovering and fixed-wing orientations. In addition, wing tilting also may dynamically change aerodynamic lift and drag forces generated by wings so that more control authority can be achieved. For the tilt rotor joint design, the invention may utilize timing belt and pulley mechanism or a gear mechanism to separate the servo motor shaft from the rotor shaft; this design may prevent a motor shaft of a motor used in such a mechanism from being damaged by vibrations and shocks on the wings. An embodiment may feature forward-swept canard wing design to help place the center of mass in the middle of the four rotors for hovering configuration; the forward swept wing design also makes the aircraft to have large stall angle for transformation and improved maneuverability.

Figure 1A:
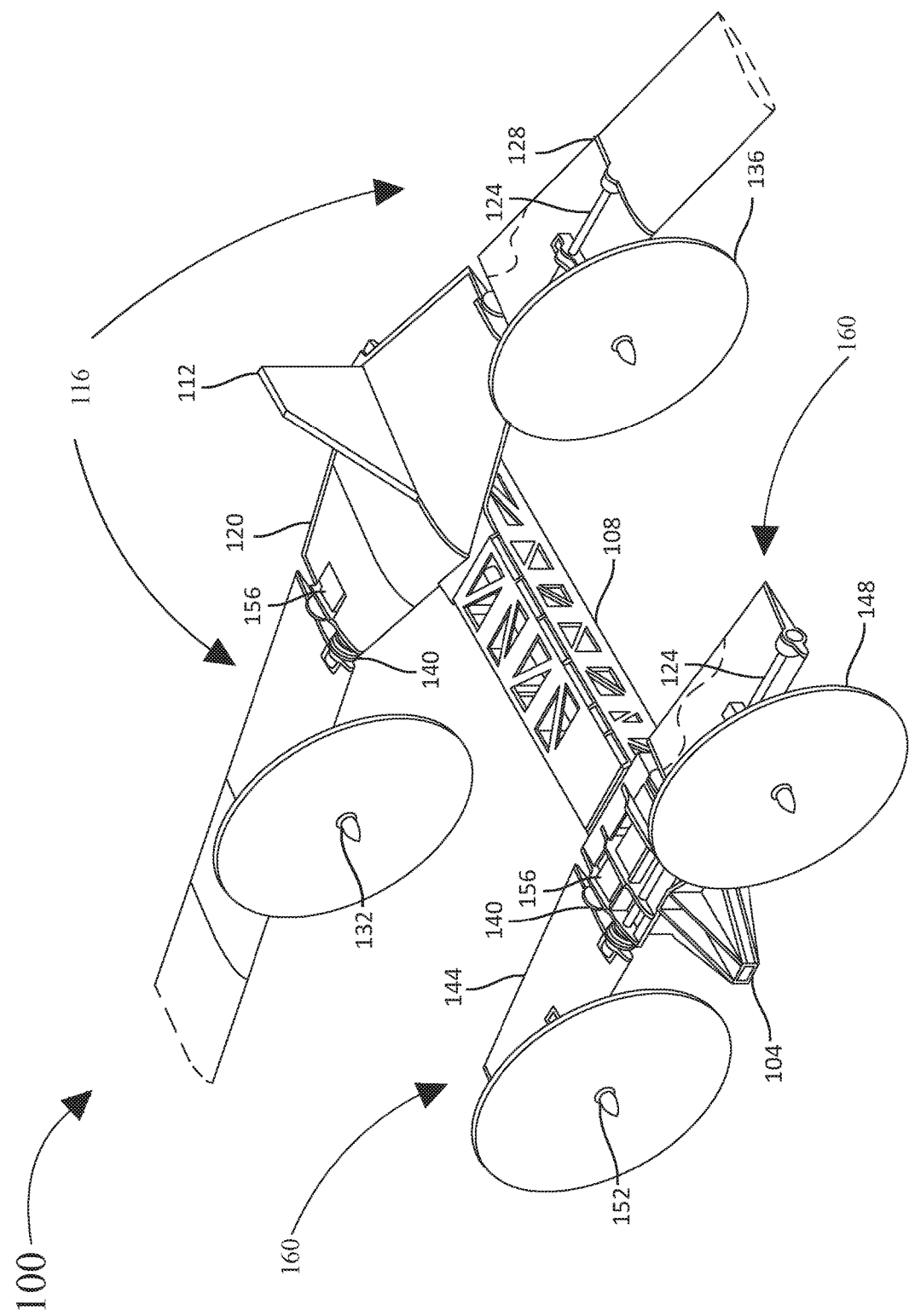
FIG. 1A is a schematic diagram illustrating an exemplary embodiment of a fixed-wing configuration of a convertible aircraft.
Figure 1B:
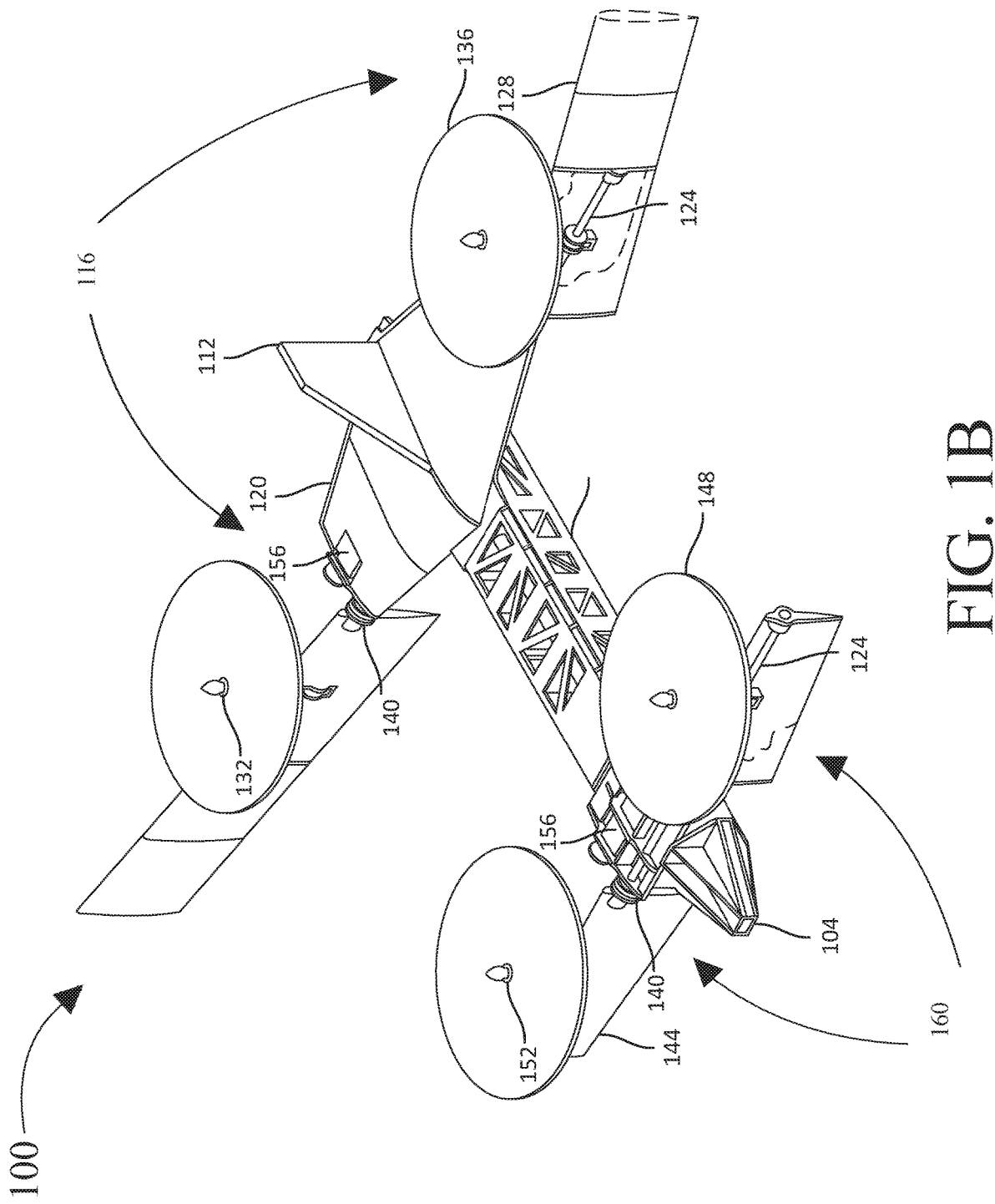
FIG. 1B is a schematic diagram illustrating an exemplary embodiment of a hovering configuration of a convertible aircraft.

Referring now to FIG. 1A, and with further reference to FIG. 1B, an exemplary embodiment of an aircraft 100 convertible between fixed-wing and hovering orientations is illustrated. A nose 104 may be connected to a fuselage 108, which may connect to at least a rudder 112. Fuselage 108 may have a frame constructed of any suitable material or combination of materials, including without limitation metal such as aluminum, titanium, steel, or the like, wood such as balsa wood, birch, oak, or the like, polymer materials such as polycarbonate, poly(methyl methacrylate), or the like, synthetic fibers such as carbon fiber, silicon carbide fiber, metallic fiber, or the like, composite materials such as fiberglass, laminated fiberglass, plywood, or the like, or any combination of the above. Fuselage 108 frame structure may consist of a box frame made up of a series of vertical, horizontal, diagonal, and longitudinal pipes made from the above mentioned materials; geodesic frame consisting of flat strip longitudinal elements called stringers wound about formers in opposite spiral directions, forming a basket-like appearance, and constructed from the above mentioned materials; monocoque shell frame consisting of a load bearing shell or skin constructed of materials mentioned above but which lacks a load-carrying internal frame; semi-monocoque frame consisting of a series of frames in the shape of the fuselage cross sections which are joined together with lightweight stringers and made from the above mentioned materials, and covered with a shell or skin attached by riveting or bonding with an adhesive material; or any combination of these or other frame constructions used in aircraft fuselage design. Fuselage 108 may also have an exterior surface, shell, or "skin" stretched over the frame of any of the materials or combination of materials above and may be constructed of any flexible material of combination of flexible materials including but not limited to those listed above for fuselage 108 frame. Fuselage 108 surface, shell, or skin and frame may be created together, may be a single monolithic structure, or one or more sections of fuselage 108 may combine skin and frame elements.

Still referring to FIG. 1A, and with further reference to FIG. 1B, aircraft 100 may include a main wing pair 116. Main wing pair may include two opposing wings connected to fuselage 108, where "opposing" signifies that the two wings are disposed on opposite sides of fuselage 108 such that when the aircraft is resting on the ground the two wings project horizontally from the fuselage with respect to the ground in opposite directions. Each wing of main wing pair 116 includes a fixed wing section 120 connected to fuselage 108. Fixed wing section 120 may be made of any material or combination of materials mentioned thereof for fuselage 108 construction, in addition to either solid foam with airfoil cross section or a hollow structure with covering that makes the outside surface, covering being made of any material or combination of materials mentioned thereof for surface, shell, or skin of fuselage 108. Each fixed wing section 120 may be attached to the fuselage 108 by any suitable process or materials, including attachment with adhesives such as epoxy and/or attachment using fiberglass sheets. Each fixed wing section 120 may include a frame, which may be constructed of any material or combination of materials suitable for use in constructing a frame of fuselage. Frame of fixed wing section 120 may be incorporated in and/or attached to frame of fuselage according to any suitable process or using any suitable manner of attachment; for instance, frame of fixed wing section 120 may be attached to frame of fuselage 108 using bolts, screws, rivets, adhesives, or the like. Frame of fixed wing section 120 may be constructed together with frame of fuselage 108 and/or a section thereof. Each fixed wing section 120 may include a shaft 124. A shaft 124 may consist of a single piece that passes through fuselage 108 and both of fixed wing section 120. A shaft 124 may be made of structurally strong materials including metals such as aluminum, titanium, steel, nickel, or the like, or structurally strong synthetic fibers such as carbon fiber, silicon carbide fiber, metallic fiber, or the like, or other structurally strong materials appropriate for shaft 124 design.

With continued reference to FIG. 1A, and with further reference to FIG. 1B, aircraft 100 includes a movable wing section 128 rotatably mounted to fixed wing section 120; for instance, movable wing section 128 may be rotatably attached to an exterior or distal end of the fixed wing section 120, where the exterior or distal end is an end of fixed wing section 120 opposite an end, which may be denoted a proximal end, that is attached to fuselage 108. Moveable wing section 128 may be made of any material or combination of materials mentioned thereof for construction of fixed wing section 120. A shaft 124 may pass from fixed wing section 120 into movable wing section 128 and may run from a first movable wing section 128 through a first fixed wing section 120 into fuselage 108, or through fuselage 108 and both of fixed wing section 120 and into both of movable wing sections 128.

Still referring to FIG. 1A, and with further reference to FIG. 1B, movable wing section 128 may be rotatable between a first movable wing section position parallel to the fixed wing section, as shown for instance in FIG. 1A, and a second movable wing section position perpendicular to the fixed wing section, for instance as shown in FIG. 1B. Second movable wing section position may be characterized as perpendicular to the fixed wing section where it directs thrust of any propulsor or propulsors mounted thereon downward with respect to fuselage 108 so as to cause aircraft 100 to hover with fuselage 108 in a substantially horizontal position. In an embodiment, and as illustrated for instance in reference to FIG. 1B, when movable wing section 128 is in second movable wing section position, aircraft 100 may be in a hovering mode; it should be noted that "hovering mode" is so designated to indicate a mode of flight wherein lift is generated a downward component of thrust from propulsors coupled to at least a propeller, such as at least a first propulsor 132 coupled to at least a first propeller 136, which may enable hovering, however persons skilled in the art will appreciate that upward, downward, forward, backward, and sideways movement through air is also possible in manner analogous to flight of rotorcraft such as helicopters and/or to flight of various "drones" and other aircraft that fly in such a configuration, such as "quadcopters" or similar craft. Movable wing section 128 may be rotatably mounted to fixed wing section 120 in any suitable manner and using any suitable devices for such attachment, including any suitable arrangement of bearings that may occur to persons skilled in the art upon reviewing the entirety of this disclosure. In an embodiment, where shaft 124 extends into movable wing section 128, movable wing section 128 may rotate about shaft 124.

Still referring to FIG. 1A, and as further illustrated in FIG. 1B, aircraft 100 includes at least a first propulsor 132 which may be mounted to each movable wing section 128. Further, an at least a first propeller 136 may mount the at least a first propulsor 132. A propulsor, as used herein, is a component or device used to propel a craft by exerting force external to the craft; propulsor may include a fluid propulsor, which exerts force on a fluid medium, which may include a gaseous medium such as air or a liquid medium such as water. Alternatively or additionally, a propulsor may exert force on solid or other media, such as on a solid surface supporting craft; propulsor may, for instance, include a wheel or similar device for terrestrial locomotion. Non-limiting examples of a propulsor may include internal combustion engines such as a piston engine, Wankel engine, turboprop engine, turboshaft engine, or the like, external combustion engines such as a steam-powered engine or the like, reaction engines such as a turbojet engine, turbofan engine, propfan engine, rocket-powered engine, motorjet engine, pulsejet engine, ramjet engine, or the like, spring powered engines, hydrogen powered engines, nuclear powered engines, electric propulsor engines, any combination thereof, or the like. A propulsor may include a motor. A motor may include without limitation, any electric motor, where an electric motor is a device that converts electrical energy into mechanical energy, for instance by causing a shaft to rotate. A motor may be driven by direct current (DC) electric power; for instance, a motor may include a brushed DC motor or the like. A motor may be driven by electric power having varied or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers (not shown) or other components for regulating motor speed, rotation direction, and/or dynamic braking. As a non-limiting example, at least a first propulsor 132 may be in the form of a brushless motor. In a brushless motor, an electrical current is passed through coils that are arranged within a fixed magnetic field. This current generates magnetic fields within the coils, causing the coil assembly to rotate, as each coil is pushed away from the like pole and pulled toward the unlike pole of the fixed field. To maintain rotation, it may be necessary to continually reverse the current so that coil polarities will continually flip, causing the coils to continue "chasing" the unlike fixed poles. Power to the coils may be supplied through fixed conductive brushes that contact a rotating commutator; the rotation of the commutator being the cause of the reversal of the current through the coils. Commutator and brushes are the key components distinguishing the brushed DC motor from other motor types.

With continued reference to FIG. 1A, and with further reference to FIG. 1B, motor may be connected to a thrust element. Thrust element may include any device or component that converts the mechanical energy of the motor, for instance in the form of rotational motion of a shaft, into thrust in a fluid medium. Thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element may include without limitation a marine propeller or screw, an impeller, a turbine, a pump-jet, a paddle or paddle-based device, or the like. Thrust element may include a rotor. Persons skilled in the art, upon reviewing the entirety of this disclosure, will be aware of various devices that may be used as thrust element. The at least a first propeller 136 mounts the at least a first propulsor 132 which is mounted to each movable wing section 128 of each of the two opposing wings. Mounting may be performed by any suitable means, including without limitation by direct or indirect attachment to shaft 124 and/or by use of a propulsor attachment assembly as described in further detail below.

Still referring to FIG. 1A, and with further reference to FIG. 1B, aircraft 100 includes at least a first rotation mechanism 140 attached to the fixed wing section 120 to couple with movable wing section 128 of each of the two opposing wings. At least a first rotation mechanism 140 is configured to rotate the movable wing section 128 between a first movable wing section position parallel to the fixed wing section 120 and a second movable wing section position perpendicular to the fixed wing section 120. With moveable wing section 128 in the first movable wing section position parallel to the fixed wing section 120 the at least a first propulsor 132 may thrust rearward with respect to orientation of fuselage 108 to cause the aircraft to move forward. With moveable wing section 128 in the second movable wing section position perpendicular to the fixed wing section 120 the at least a first propulsor 132 may thrust downward with respect to orientation of fuselage 108 to cause the aircraft to hover in place. Each rotation mechanism associated with the at least a first rotation mechanism 140 may include a servomotor mounted in the fixed wing section 120 with the servomotor acting to induce a rotation of servomotor shaft offset from an axis of rotation of the movable wing section 128, and an actuator mechanically coupling the rotor to the movable wing section 128. Servomotor may include any suitable motor as described above, including without limitation a servomotor. A servomotor may consist of a rotary actuator or linear actuator that allows for precise control of angular or linear position, velocity and/or acceleration. A servomotor may further consist of a suitable motor coupled to a sensor for position feedback and may also require a controller for digital or analogue signal processing for generation of the feedback. Implementation of servo motors within the present disclosure is described below. Actuator may include any suitable mechanism for transfer of rotary motion from one mechanical element to another, including without limitation a pulley and belt mechanism or a gear mechanism where a first gear may be affixed to the rotor and a second gear may be affected to the movable wing section 128, wherein the first gear may be coupled with the second gear. Both the pulley and belt and gear mechanisms are described in more detail below.

With continued referend to FIG. 1A, and with further reference to FIG. 1B, functions and components of the at least a first rotation mechanism 140 for a movable wing section 128 may also be applied to at least a second rotation mechanism for a canard 144 of the convertible aircraft. At least a second rotation mechanism may include any mechanism suitable for use as at least a first rotation mechanism 140 and may function in an identical manner as described below so may be used, described, and/or illustrated interchangeably with reference to at least a rotation mechanism 140. Further, an at least a second propeller 148 may mount an at least a second propulsor 152 which may be mounted to the canard 144. At least a second propulsor 152 may include any propulsor or propulsors suitable for use as at least a first propulsor 132. The canard 144 may be made of any material or combination of materials mentioned thereof for construction of fixed wing section 120 and movable wing section 128.

Now with continued reference to FIG. 1A, and with further reference to FIG. 1B, first and second rotation mechanisms may rotate each canard 144 and each movable wing section 128, respectively. Where such mechanisms include servomotors as described above, they may be collectively these can be referred to as servomotor 156 as they may function in an identical fashion. Each canard 144 may rotate about at least a front shaft and each movable wing section 128 may rotate about at least a rear shaft. Collectively these shafts may be referred to as shaft 124 as they may function in an identical fashion. Using this tilt rotor mechanism, a motor such as a servo motor 156 of each canard 144 and each moveable wing section 128 may be driven by remote control commands, manually operated electrical commands, and/or instructions generated by a flight controller as described in further detail below to control angular positions of each canard 144 and each movable wing section 128 to transform between fixed-wing configuration, as shown in FIG. 1A, and hovering configuration, as shown in FIG. 1B. Tilt rotor has been successful in other applications such as Osprey v22 Military Aircraft which uses two rotors, however, the at least four servo motors disclosed herein may rotate both each canard 144 and each movable wing section 128 to fully take advantage of a more stable hovering configuration while also allowing for independent tilt angle control of left side and right side of each canard 144 and each movable wing section 128. This construction may lead to removal of control surfaces such as ailerons and elevators, therefore simplifying wing and canard structure. Rotation mechanisms 144 may be implemented in a multitude of ways including but not limited to a timing belt and pulley mechanism or a gear system as described below. The tilt-rotor mechanisms mentioned herein for canard 144 may also be suitable for use in the movable wing section 128.

Figure 2:
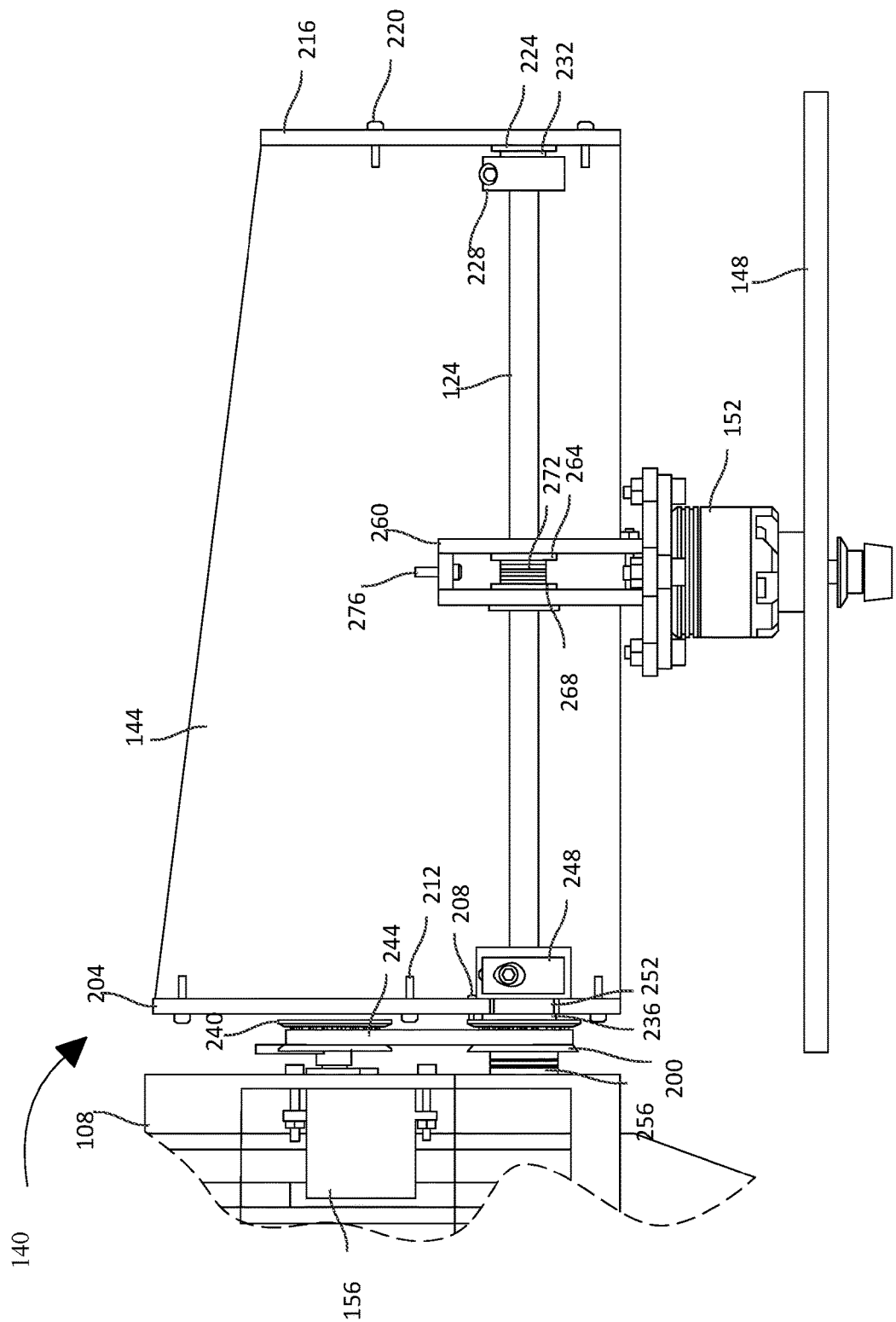
FIG. 2 is a schematic diagram illustrating an exemplary embodiment of belt and pulley mechanism with rotor shaft constraint for a tilt rotor joint of a convertible aircraft.

Referring now to FIG. 2, each canard 144 and/or movable wing section 128 may rotate about the at least a shaft 124. In an embodiment, an actuator mechanism may include a pully pulley 200 which may be fixed to at least a root structural rib 204 by at least a screw 208. The at least a root structural rib 204 may be attached to the root of each canard 144 and/or movable wing section 128 by any suitable fastening means including adhesives, bolds, rivets, or at least a screw 212. At least a tip structural rib 216 may be fixed to the end of each canard 144 by a fastening means such as at least a screw 220. At least a flanged bearing 224 may be fitted to the at least a shaft 124 while the outer race of at least a flanged bearing 224 is fit to the hole on the at least a tip structural rib 216. A flange side of at least a bearing 224 may be placed towards the fuselage 108; this may cause the at least a bearing 224 constrained from sliding away from the fuselage 108. To hold the at least a bearing 224, at least a shaft collar 228 may be placed with at least a washer 232. At least a washer 232 may have an outer diameter that is smaller than the diameter of the outer race of the at least a bearing 224 to allow the outer race of the at least a bearing 224 to spin with at least a canard 144 and/or movable wing section 128. On a root of each canard 144 and/or movable wing section 128, at least a bearing 236 may be fitted on the at least a shaft 124 with outer race fitted to a hole on the at least a root structural rib 204. A flange side of the at least a bearing 236 may be placed towards each canard 144 and/or movable wing section 128. This may prevent the at least a bearing 236 from sliding out towards the tip of each canard 144 and/or movable wing section 128.

Still referring to FIG. 2, an exemplary embodiment of a timing belt and pulley mechanism with rotor shaft constraint for a tilt rotor joint of a convertible aircraft is illustrated. Canard 144 and/or movable wing section 128 may be coupled together with at least a canard timing pulley 200 which may rotate about at least a shaft 124. Rotation of canard 144 and/or movable wing section 128 may be controlled by a motor such as without limitation at least a servo motor 156 coupled to at least a timing pulley 240, wherein at least a canard and/or movable wing section 128 timing pulley 200 and the timing pulley 240 by a motor share at least a timing belt 244. As the at least a motor rotates, at least a timing pulley 240 coupled to the at least a motor may rotate. The motion of at least a timing pulley 240 may be transferred to at last a canard and/or movable wing section timing pulley 200 through the at least a timing belt 244. The use of the at least a timing belt 244 may reduce the chance of backlash in rotation therefore allowing for precise control of the angular position of the at least a canard 144 and/or movable wing section 128.

With continued reference to FIG. 2, each canard 144 and/or movable wing section 128 may rotate about at least a shaft 124. At least a canard and/or movable wing section 128 timing pulley 200 may be fixed to at least a root structural rib 204 by any suitable means of fastening including without limitation adhesion, bolts, rivets, and/or at least a screw 208. At least a root structural rib 204 may be attached to the root of each canard 144 and/or movable wing section 128 by any suitable fastening means as described above, including without limitation at least a screw 212. At least a tip structural rib 216 may be fixed to the end of each canard 144 and/or movable wing section 128 by any suitable fastening means as described above, including at least a screw 220. At least a flanged bearing 224 may be fitted to at least a shaft 124 while an outer race of at least a flanged bearing 224 is fit to the hole on at least a tip structural rib 216. A flange side of at least a bearing 224 may be placed towards fuselage 108; this may make at least a bearing 224 constrained from sliding away from the fuselage 108. To hold the at least a bearing 224, at least a shaft collar 228 may be placed with at least a washer 232. At least a washer 232 may have an outer diameter that is smaller than the diameter of the outer race of the at least a bearing 224 to allow the outer race of the at least a bearing 224 to spin with the at least a canard 144. On the root of each canard 144 and/or movable wing section 128, at least a bearing 236 may be fitted on the at least a shaft 124 with outer race fitted to a hole on the at least a root structural rib 204. A flange side of the at least a bearing 236 may be placed towards each canard 144; this may prevent at least a bearing 236 from sliding out towards the tip of each canard 144. At least a canard and/or movable wing section timing pulley 200 may have a circular pocket with diameter approximately the size of the flange diameter of the at least a bearing 236. A pocket on the at least a canard and/or movable wing section timing pulley 200 may also have a center hole with diameter large enough so the at least a canard and/or movable wing section 128 timing pulley 200 may not contact the inner race of the at least a bearing 236; this may allow an outer race of the at least a bearing 236 to rotate with the at least a root structural rib 204 which may be controlled by the at least a canard and/or movable wing section 128 timing pulley 200. Each canard 144 and/or movable wing section 128 may be constrained from sliding away from fuselage 108 by using at least a shaft collar 248. At least a shaft collar 248 may be placed with at least a washer 252 to ensure the outer race of the at least a bearing 236 does not contact the at least a shaft collar 248. At least a shaft collar 248 may also push each canard 144 and/or movable wing section 128 assembly towards fuselage 108. At least a thrust bearing 256 may be used to allow the at least a canard and/or movable wing section 128 timing pulley 200 to rotate with minimum friction while preventing each canard 144 and/or movable wing section 128 from sliding out from the at least a shaft 124. At least a propulsor such as at least a first propulsor 132 and/or the at least a second propulsor 152 may be mounted on each canard 144 and/or movable wing section 128 by propulsor attachment assembly 260; the propulsor attachment assembly 260 may have mounting holes to connect at least a second propulsor 148. Propulsor attachment assembly 260 may also have holes to mount outer races of at least a bearing 264 and at least a bearing 268. A flange of at least a bearing 264 flange and a flange of at least a bearing 268 may be placed to face each other; this may allow the at least a bearing 264 and the at least a bearing 268 to slide out when the at least a bearing 264 and the at least a bearing 268 are pushed to the center of the propulsor attachment assembly 260. To prevent sliding, at least a washer 272 may be placed to contact an inner race of at least a bearing 264 and at least a bearing 268, stacking enough of the at least a washer 272 to make sure at least a bearing 264 and at least a bearing 268 do not slide along the at least a shaft 124; this bearing and spacer arrangement may allow the at least a second propulsor change the tilt angle as required. To couple the motion of each canard 144 and/or movable wing section 128 with the tilt angle, at least a screw 276 may be used to fix the propulsor attachment assembly 260 with each canard 144 and/or movable wing section 128 body.

Figure 3:
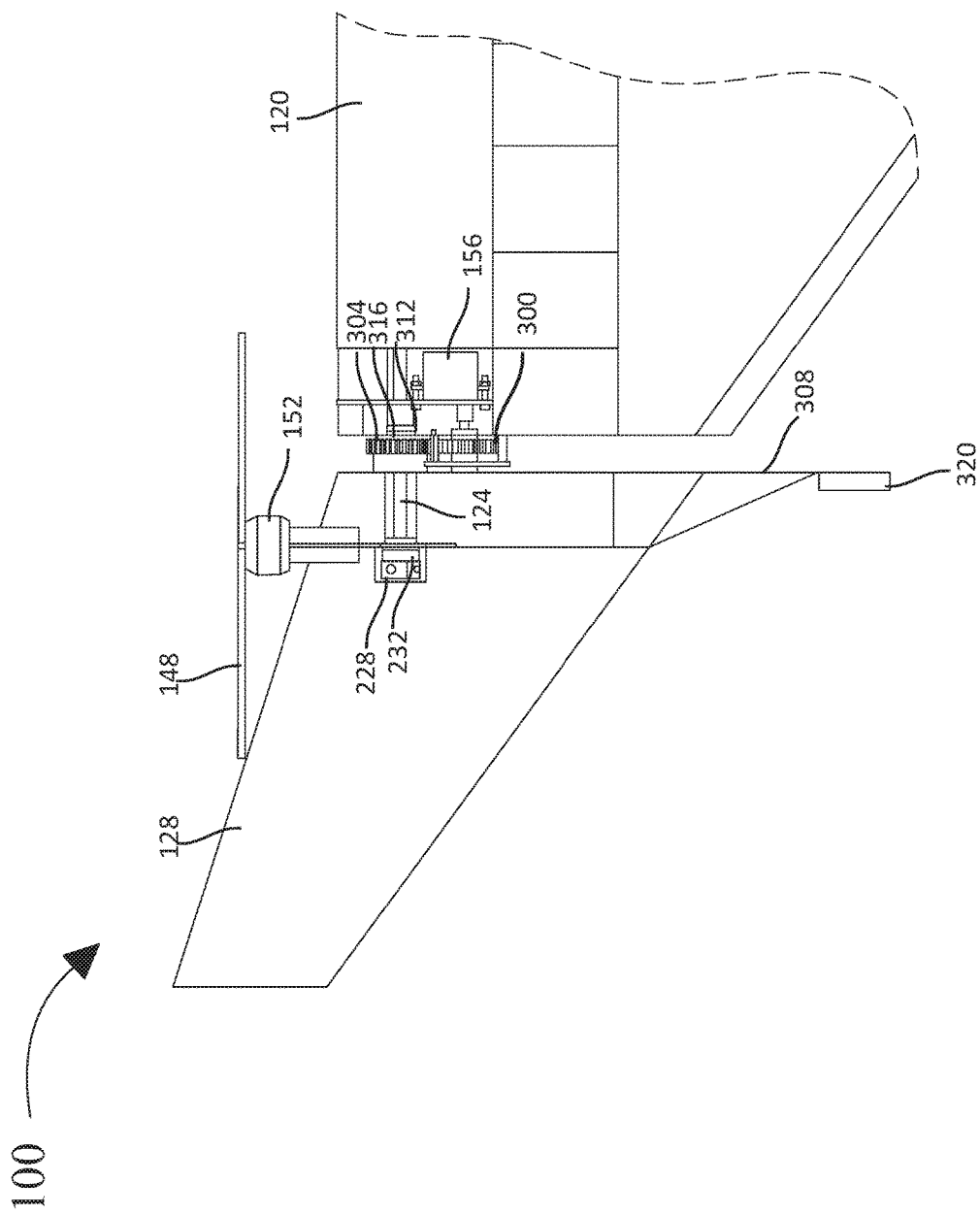
FIG. 3 is a schematic diagram illustrating an exemplary embodiment of gear actuated tilt wing mechanism with rotor shaft constraint for a tilt rotor joint of a convertible aircraft.

Now referring to FIG. 3, an exemplary embodiment of a gear actuated tilt wing mechanism with rotor shaft constraint design of a convertible aircraft is described. At least a propulsor may be mounted to the canard 144 and/or movable wing section 128. Canard 144 and/or movable wing section 128 may, as a non-limiting example, be made of solid foam with airfoil cross section or a hollow structure with covering that makes an outside surface. At least motor 156 may be affixed to a first gear 300, and the first gear 300 being coupled to a second gear 304. Each canard 144 and/or movable wing section 128 may be coupled together with the second gear 304 which may rotate about at least a shaft 124. Rotation of canard 144 and/or movable wing section 128 may be controlled by the at least a servo motor 156 coupled to the first gear 300, where at least a motor 156 may rotate first gear 300 coupled to second gear 304 causing rotation of canard 144 and/or movable wing section 128. Use of a gear system could be implemented for ease of system assembly when compared to the belt and pulley mechanism.

Still referring to FIG. 3 each canard 144 and/or movable wing section 128 may rotate about at least a shaft 124. Second gear 304 may be attached to at least a wing rib 308 by at least a mechanical joint such as screw and nut or epoxy. At least a wing rib 308 may be fixed to each canard 144 and/or movable wing section 128 by any suitable fastener as described above, including epoxy. In an exemplary gear system design, at least a wing rib 308 may consist of plastic and/or carbon fiber for structural rigidity. Further, use of plastic and/or carbon fiber may allow for precision in locating a gear position of interest. Torque may be transmitted to at least a wing rib 308 of a canard 144 and/or movable wing section 128 upon first gear 300 rotation by at least a motor 156 activation, and with at least a thrust bearing 312 and at least a sleeve bearing 316 coupled to the at least a shaft 124 to reduce friction, which may cause the canard 144 and/or movable wing section 128 to rotate. At least a shaft collar 228 may be placed with at least a washer 232 to prevent canard 144 and/or movable wing section 128 from sliding out from the at least a shaft 124. The at least washer 232 may be spring loaded and affixed to the end of the at least a shaft 124 may provide pre-loaded thrust to prevent each canard 144 and/or movable wing section 128 from having a sliding motion on the at least a rotation shaft 124, but with a thrust bearing 312 also coupled to the at least a shaft 124 to still allowing for canard 144 and/or movable wing section 128 rotation.

Still referring to FIG. 3, one or more counterweights and/or elements of landing gear 320, such as without limitation wheels, runners, pontoons, or the like, may be incorporated in and/or attached to each or either movable wing section 128 and/or on canards as described in further detail below. In addition to permitting aircraft 100 to land in hovering mode, landing gear 320 may act to counterbalance movable wing sections 128 and/or canards; for instance, a moment induced by at least a first propulsor 132 and/or the at least a second propulsor 152 around any of the rotating axis of an aircraft as depicted above may be balanced by the moment induced by at least a motor weight balance 320, which may include without limitation landing gear, around each rotating axis. In fixed wing mode, the moment around at least a shaft 124 of at least a servo motor 156 may become perfectly balanced such that no constant torque is required from the at least a servo motor 156 to prevent either propulsor from rotating the wing back to 90 degrees downward. Depending on the moment generated by the thruster, this design may significantly reduce the power consumption of the at least a servo motor 156 when the at least a servo motor 156 is not actively engaged in tilting neither a movable wing section 128 and/or a canard 144.

Figure 4:
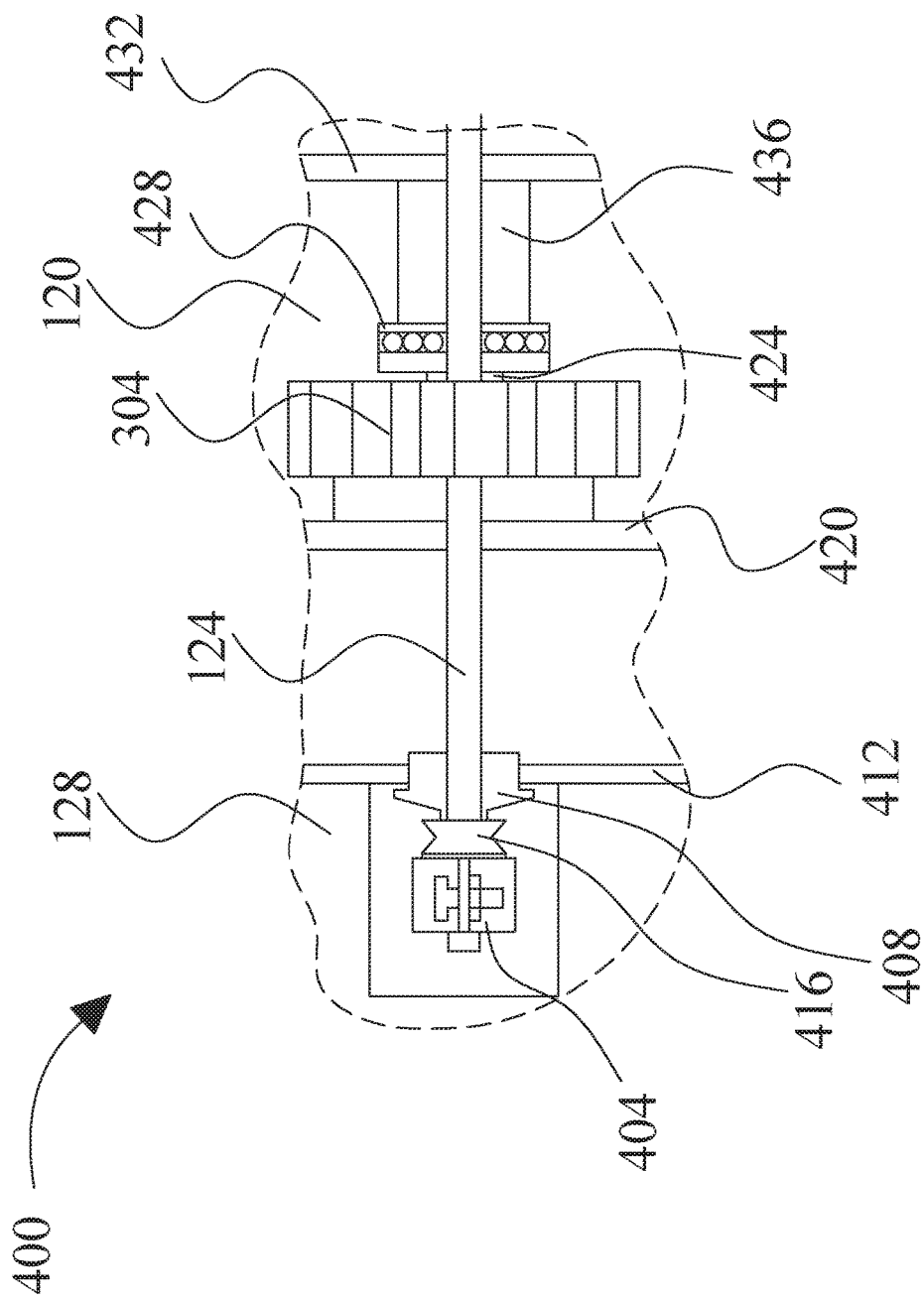
FIG. 4 is a schematic diagram illustration an exemplary embodiment of a shaft constraint mechanism.

Referring now to FIG. 4, an exemplary embodiment a shaft-constraint mechanism 400 is illustrated. A shaft clamp 404 installed in movable wing section 128 and/or canard 404 may be secured a distal end of shaft 124; movable wing section 128 and/or canard may be freed to rotate with respect to shaft 124 and/or shaft clamp 404 by a bearing 408 set in a structural rib 412. A spring washer 416 may generate a recoil force, urging movable wing section 128 and/or canard and gear 304 against fixed wing section 120. Gear 304 may be attached to movable wing section fixedly by use of any suitable fastener, including without limitation screws, adhesives, bolts, or the like; attachment may be effected to a structural rib 420 of movable wing section 128 and/or canard. Gear 304 may be journaled on a sleeve bearing 424 about shaft 124. A thrust bearing 428, which may include one or more ball bearings, may be offset from a main wing structural rib 432 within fixed wing section 120 by a spacer 436, and may act to permit movable wing section 128 and/or canard to rotate about shaft 124 despite being urged against fixed wing section 120. Rotation shaft maybe constrained from sliding along shaft, while permitting movable wing section 128 and/or canard to rotate as a result of constraint mechanism. The above-described constraint mechanism 400 is described for illustrative purposes only and is not intended to be limiting.

Referring again to FIG. 1A, and with further reference to FIG. 1B, a front wing pair 160 may comprise two opposing canards connected to fuselage 108 in front of main wing pair 116 where "opposing" signifies that the two wings are disposed on opposite sides of fuselage 108 such that when the aircraft is resting on the ground the two wings project horizontally from the fuselage with respect to the ground in opposite directions. Each individual canard 144 may be rotatably attached to fuselage 108 similarly as to how movable wing section 128 is rotatably attached to fixed wing section 120. Canard 144 may be made of any material or combination of materials mentioned thereof for construction of movable wing section 128. A shaft 124 may pass from fuselage 108 into each canard 144, or through fuselage 108 and into both of canard 144.

Still referring to FIG. 1A, canard 144 may be rotatable between a first movable wing section position parallel to the fixed wing section, as shown for instance in FIG. 1A, and a second movable wing section position perpendicular to the fixed wing section, for instance as shown in FIG. 1B. Second movable wing section position may be characterized as perpendicular to the fixed wing section where it directs thrust of any propulsor or propulsors mounted thereon downward with respect to fuselage 108 so as to cause aircraft 100 to hover with fuselage 108 in a substantially horizontal position. In an embodiment, and as illustrated for instance in reference to FIG. 1B, when canard 144 is in second movable wing section position, aircraft 100 may be in a hovering mode. Canard 144 may be rotatably mounted to fuselage 108 in any suitable manner and using any suitable devices for such attachment, including any suitable arrangement of bearings that may occur to persons skilled in the art upon reviewing the entirety of this disclosure. In an embodiment, where shaft 124 extends into canard 144, canard 144 may rotate about shaft 124.

Still referring to FIG. 1A, and as further illustrated in FIG. 1B, aircraft 100 includes at least a second propulsor 152 which may be mounted to each canard 144. A propulsor, as used herein, may be mounted to each of canard 144 and function in an identical fashion to that of the at least a first propulsor 132 mounted to each of movable wing section 128, further including all components mentioned therein including at least a propeller, referred to as the at least a second propeller here.

Figure 5:
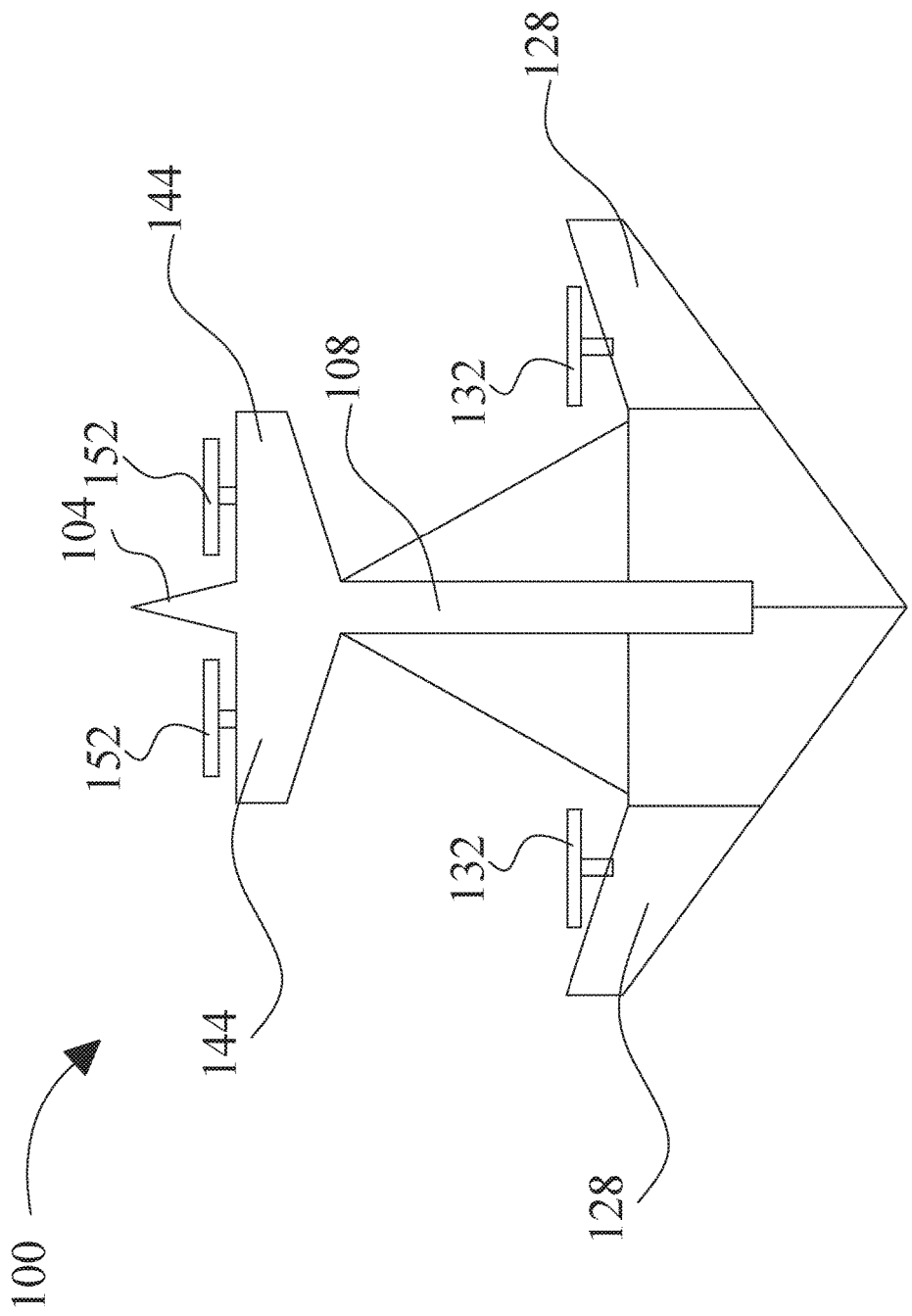
FIG. 5 is a schematic diagram illustrating an exemplary embodiment of top view of an aircraft layout for forward-flight attitude control.

Now referring to FIG. 5, an exemplary embodiment of the layout for forward-flight attitude control is described. A typical drawback of tilt-wing, tilt-rotor VTOL design is the existence of redundant actuators. For example, in most tilt-wing designs, besides actuators used for tilting the wings, extra servo motors for control surfaces (elevators or ailerons) are required for attitude control in forward flight mode. Although control surfaces are standard design in fixed wing airplane, they are redundant actuators in a tilt-wing design because the incidence angles of the four wings can already be actively controlled in VTOL design. Therefore, it is proposed herein to have 8 actuators in total: four actuators for providing thrust (e.g. brushless motors) and four actuators for wing rotation (e.g. servo motors). The rotation of four wings may be controlled independently so that better controllability of the UAV can be achieved. In hovering mode, mature control strategies for hovering flight may be readily implemented in the UAV proposed herein. In fixed-wing mode, conventional forward flight control techniques may be adapted straightforward to the UAV proposed herein, for example, to pitch up, the front two wings can be rotated upward; to roll left, the rear-left wing can be rotated down and the rear-right wing can be rotated up; to yaw left, the thrust generated by the left two wings can be decreased while the thrust generated by the right two wings can be increased.

Now with reference to FIG. 6, an exemplary embodiment of the hovering capabilities of an aircraft with an angled fuselage and tilted wings is described. Common VTOL designs, such as quad plane, tail-sitter, and tiltrotor can only hover/stabilize when the fuselage is within certain degree range. With the proposed quad-tilt-wing design herein, a VTOL aircraft may hover with the fuselage pitched at an arbitrary angle from −90 degrees to 90 degrees. This configuration may enable a convenient vehicle-to-vehicle docking system, as well as loading and unloading from the aircraft fuselage. For instance, and without limitation, each rotation mechanism of at least a first rotation mechanism may be configured to rotate movable wing section 128 to a third movable wing section position intermediate between the first moveable wing section position and the second movable wing section position; at least a second rotation mechanism attached to each canard and to the fuselage, wherein the at least a second rotation mechanism is configured to rotate each canard between a first canard position parallel to the first movable wing section position and a third canard position parallel to the third movable wing section position. Aircraft may be configured to engage in hovering flight while the movable wing sections are in the third movable wing and the canards are in the third canard position. Depending on an angle between vertical and horizontal with respect to fuselage of third movable wing position and third canard position, aircraft may hover in a tilted or near vertical position when so placed.

At least a storage compartment 600 may be used to store and/or deploy smaller drones from aircraft 100. Now referring to FIG. 7, an exemplary embodiment of a storage compartment 600 within the fuselage of a larger aircraft where smaller aircrafts 700 in hovering form are able to be stored, deployed, and recaptured is illustrated. Deploying and collecting small swarms of UAVs from larger aircraft (or carrier aircraft) is of critical importance in defense, surveillance, and inspection types of applications. The larger aircraft presented herein may hover with fuselage at arbitrary angles. The deployment and collection of smaller quadcopter aircrafts from this aircraft is made easy. In addition, the small quadcopter aircrafts can be stored inside the larger aircraft fuselage in a vertical configuration which increases capacity. Each compartment 600 may include a release mechanism 704 that latches onto a smaller aircraft and/or drone stored therein; latch mechanism may be electrically or electromechanically actuated, for instance using solenoid bolts, electromagnets, or any other mechanism that may occur to persons skilled in the art, and may be operated by any flight controller as described in further detail below.

Figure 8:
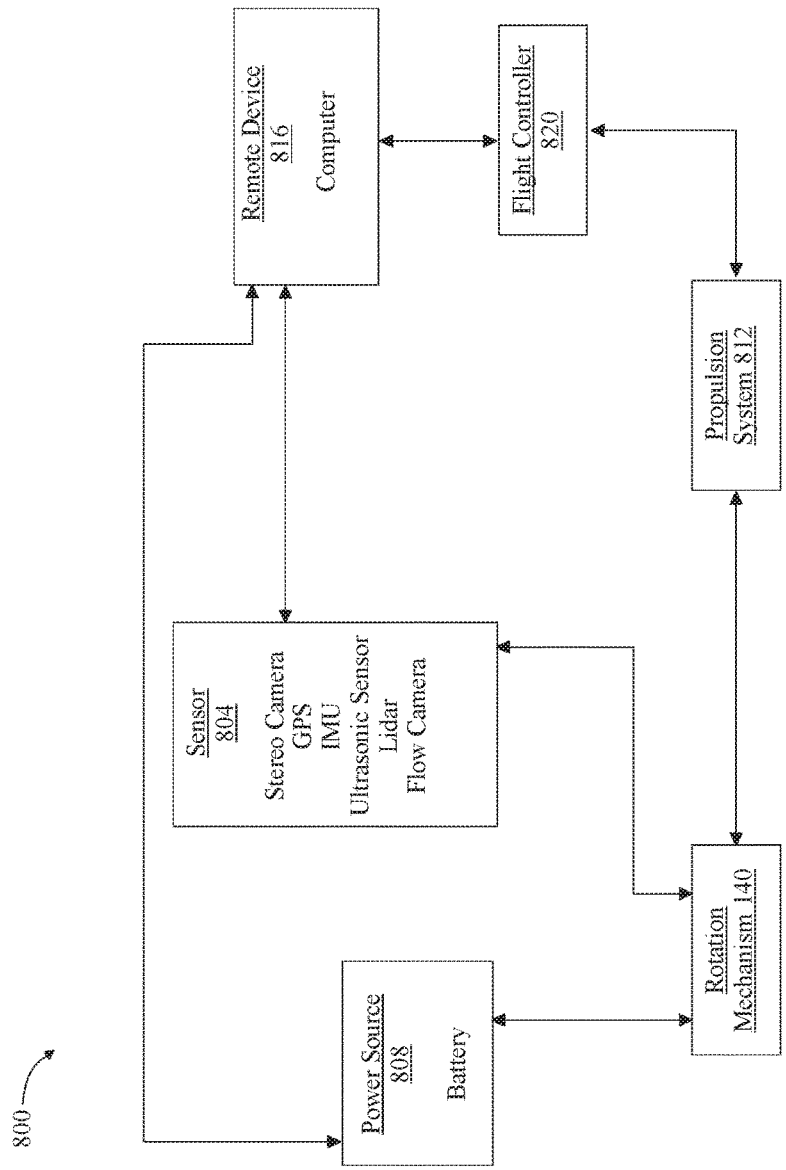
FIG. 8 is a schematic diagram illustrating an exemplary embodiment of a hardware and software architecture for auto piloting the convertible aircraft.

Now with reference to FIG. 8, an exemplary embodiment 800 of the hardware and software architecture for auto piloting a convertible aircraft is described. Hardware 800 may include at least a sensor 804. At least a sensor 804 may include sensors including but not limited to a stereo camera for vision, global positioning system (GPS), inertial measurement unit (IMU), ultrasonic sensor, Lidar and flow camera, ultrasonic sensor, and the like. Hardware 800 may include a power source 808. Power source 808 may include for example a battery. Hardware 800 may include at least a propulsion system 812, which may include at least a propulsor 152, at least a propulsor 132, and/or at least a rotation mechanism 140. In an embodiment, and advantageously, a design of aircraft 100 may require only 4 brushless motors for main propulsion and 4 servo motors for transformation, this may represent a markedly lighter design than a typical aircraft, which frequently requires multiple servos to manipulate flight control surfaces. Hardware 800 may include a remote device 816 which may include a computation system, and which may contain a high-end strong capability GPU-supported NVIDIA Jetson TX2 module for vision system, and a low-level pixhawk mini microcontroller for hardware control and communications. The software may run on both companion computers and pixhawk microcontroller. Hardware 800 may include a flight controller 820; flight controller may include any computing device as described herein, including companion computers, microcontrollers, or the like. Flight controller may be deployed on aircraft 100 and/or remotely. Each smaller aircraft 700 as described above may include a flight controller as well, which may be controlled by or part of flight controller 820, and/or controlled remotely from ground or other aircraft.

With continued reference to FIG. 8, flight controller 820 may be communicatively connected to power source 808. As used herein, "communicatively connecting" is a process whereby one device, component, or circuit is able to receive data from and/or transmit data to another device, component, or circuit. In an embodiment, communicatively connecting includes electrically coupling at least an output of one device, component, or circuit to at least an input of another device, component, or circuit. Communicative connecting may be performed via a bus or other facility for intercommunication between elements of a computing device. Communicative connecting may include indirect connections via "wireless" connection, radio communication, optical communication, magnetic, capacitive, or optical coupling, or the like. Controller 820 may include any computing device or combination of computing devices as described herein. Controller may include any processor or combination of processors as described herein. Controller may include a microcontroller. Controller 820 may be incorporated in the electric aircraft or may be in remote contact. In an embodiment, controller 820 may designed and configured to measure at least an electrical parameter of at least an electrical energy source contained within power source 808, determine, using the at least an electrical parameter, a power-production capability of the at least an electrical energy source, calculate at least a projected power-consumption need of electric aircraft, as a function of a flight plan for the electric aircraft, and determine whether the power-production capability is sufficient for the projected power-consumption need, as described in further detail below. In an embodiment, controller 820 may be programmed to operate electronic aircraft to perform at least a flight maneuver; at least a flight maneuver may include takeoff, landing, stability control maneuvers, emergency response maneuvers, regulation of altitude, roll, pitch, yaw, speed, acceleration, or the like during any phase of flight. At least a flight maneuver may include a flight plan or sequence of maneuvers to be performed during a flight plan. At least a flight maneuver may include a runway landing, defined herein as a landing in which a fixed-wing aircraft, or other aircraft that generates lift by moving a foil forward through air, flies forward toward a flat area of ground or water, alighting on the flat area and then moving forward until momentum is exhausted on wheels or (in the case of landing on water) pontoons; momentum may be exhausted more rapidly by reverse thrust using propulsors, mechanical braking, electric braking, or the like. At least a flight maneuver may include a vertical landing protocol, which may include a rotor-based landing such as one performed by rotorcraft such as helicopters or the like. In an embodiment, vertical landing protocols may require greater expenditure of energy than runway-based landings; the former may, for instance, require substantial expenditure of energy to maintain a hover or near-hover while descending, while the latter may require a net decrease in energy to approach or achieve aerodynamic stall. Controller 820 may be designed and configured to operate electronic aircraft via fly-by-wire.

With continued reference to FIG. 8, controller 820 may be communicatively connected, as defined above, to each propulsor of the plurality of propulsors contained within propulsion system 812; as used herein, controller 820 may be communicatively connected to each propulsor where controller 820 is able to transmit signals to each propulsor and each propulsor is configured to modify an aspect of propulsor behavior in response to the signals. As a non-limiting example, controller 820 may transmit signals to a propulsor via an electrical circuit connecting controller 820 to the propulsion system 812; the circuit may include a direct conductive path from controller 820 to propulsion system 812 or may include an isolated coupling such as an optical or inductive coupling. Alternatively or additionally, controller 820 may communicate with a propulsor of plurality of propulsors using wireless communication, such as without limitation communication performed using electromagnetic radiation including optical and/or radio communication, or communication via magnetic or capacitive coupling. Persons skilled in the art will be aware, after reviewing the entirety of this disclosure, of many different forms and protocols of communication that may be used to communicatively couple controller 820 to plurality of propulsors contained within propulsion system 812.

With continued reference to FIG. 8, controller 820 may direct loads, which may include first load, to perform one or more flight maneuvers as described above, including takeoff, landing, and the like. Controller 820 may be configured to perform a partially or fully automated flight plan. In an embodiment, controller 820 may be configured to command first load, such as one or more motors or propellers, to increase power consumption, for instance to transition to rotor-based flight at aerodynamic stall during a vertical landing procedure or to a runway based controlled descent. Controller 820 may determine a moment to send a command to an instrument to measure time, such as a clock, by receiving a signal from one or more sensors 804, or a combination thereof; for instance, controller 820 may determine by reference to a clock and/or navigational systems and sensors that aircraft is approaching a destination point, reduce airspeed to approach aerodynamic stall, and may generate a timing-based prediction for the moment of aerodynamic stall to compare to a timer, while also sensing a velocity or other factor consistent with aerodynamic stall before issuing the command. Persons skilled in the art will be aware, upon reviewing the entirety of this disclosure, of various combinations of sensor inputs and programming inputs that controller 820 may use to guide, modify, or initiate flight maneuvers including landing, steering, adjustment of route, and the like.

With continued reference to FIG. 8, hardware 800 may include rotation mechanism 824. In an embodiment, rotation mechanism 140 may be a component of propulsion system 812.

With continued reference to FIG. 8, operation of convertible aircraft mentioned herein may be done so by methods mentioned above combined with optimization-based flight control algorithms for stabilization, transformation, and motion planning of a convertible aircraft. Implementation of such algorithms may be done so via computer systems and/or sensors such as those mentioned above. Since the convertible aircraft may transform between a hovering and a fixed-wing state there are at least two flight modes, namely hovering mode and fixed-wing mode. When the aircraft is operating in hovering mode, control algorithms based on linear quadratic regulator (LQR) may be implemented. In hovering mode, a fixed point (x*, u*) may be chosen, then the nonlinear flight dynamics can be linearized ($\bar{x}=x-x^*$, $u=u-u^*$, $\dot{\bar{x}}=A\bar{x}+B\bar{x}$) around this fixed point to generate linear A and B matrices. After linearization, A and B matrices, together with cost matrices (Q, R) may be used to solve algebraic Riccati equation (K=LQR(A, B, Q, R)) to get optimal feedback gain matrix K, which may then be used as the optimal feedback control policy ($\bar{u}=-K\bar{x}$). Implementation of such algorithms mentioned are nonlimiting examples of how to stabilize the convertible aircraft in hovering mode.

In fixed-wing mode of convertible aircraft, control algorithms based on linear quadratic regulator (LQR) may also be implemented. A flight goal may set in the form of a state goal ($x^{trim}$), usually involving a stable forward flight at a certain speed. Since it is nontrivial to calculate the control inputs that will meet the state goal ($x^{trim}$), a two-step trajectory optimization may be used to solve for the control input (find→$u^{trim}$, s. t.→x[1].tail(11)=x[0].tail(11)=$x^{trim}$.tail (11), $u_{min} \leq u^{trim} \leq u_{max}$, x[1]=f(x[0], $u^{trim}$)). Then a truncated/reduced state goal and control goal together may be used to linearize the nonlinear dynamics ($X_{reduced}$=[Y, Z, Ø, θ, ψ, $\dot{X}$, $\dot{Y}$, $\dot{Z}$, $\dot{Ø}$, $\dot{θ}$, $\dot{ψ}$]$^T$, $\bar{x}=x_{reduced}-x^{trim}$.tail (11), $\bar{\dot{x}}_{reduced}=A_{reduced}\bar{x}_{reduced}+B_{reduced}\bar{u}$), which yields A and B matrices. The reason why the state goal may be truncated is because the position cannot stay fixed in a stable forward flight. Similarly, to LQR in hovering mode, four matrices A, B, Q and R may be used to solve the algebraic Riccati equation ($K_{reduced}$=LQR($A_{reduced}$, $B_{reduced}$, Q, R), K=Zeropadding ($K_{reduced}$)) to get the optimal gain matrix K. After some zero padding to meet the dimension requirement, the optimal feedback gain matrix K may be used as the control policy ($\bar{u}=-K\bar{x}$). Implementation of such algorithms mentioned are nonlimiting examples of how to stabilize the convertible aircraft in fixed-wing mode.

A significant part of the flight control system may be to transform the aircraft between hovering mode and fixed-wing mode, referred to herein as mode transition. Trajectory optimization together with time-varying LQR (TVLQR) may be used to perform such a transition. First, fixed point (x*, u*), trim point $x^{trim}$, $u^{trim}$, and cost matrices (Q, R) must be calculated. A trajectory optimization ($_{u[\cdot],x[\cdot],h}^{min}$ J=$\Sigma_{i=0}^{N-1}$h[i]·$u^T$[i]Ru[i],x[0]=x*, u[0]=u*, x[N]=$x^{trim}$, u[N−1]=$u^{trim}$, x[i+1]=x[i]+h[i]·f(x[i], u[i]), $u_{min} \leq u[i] \leq u_{max}$, $x_{min} \leq x[i] \leq x_{max}$, |u[i+1].tail(4)−u[i].tail(4)|<$\dot{u}_{max}^{tilt}$·h[i]) may first be used to solve for trajectory knot points that take the aircraft from a fixed point (hovering mode) to a trim point (fixed-wing mode) or vice versa. Then for each trajectory knot point, LQR stabilization for each (x[i], u[i]): $\bar{\dot{x}}=A_i\bar{x}+B_i\bar{u}$, $K_i$=LQR($A_i$, $B_i$, Q, R), K(t)=FirstOrderHold ($K_i$)) may be performed so that the trajectory can be tracked. The resulting final optimal feedback control gain matrix may be a time-varying matrix that is the first order hold of all the knot point gain matrices ($\bar{u}=-K\bar{x}$). Implementation of such algorithms mentioned are nonlimiting examples of how to stabilize the convertible aircraft in the transition phase between hovering mode and fixed-wing mode, or vice versa.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
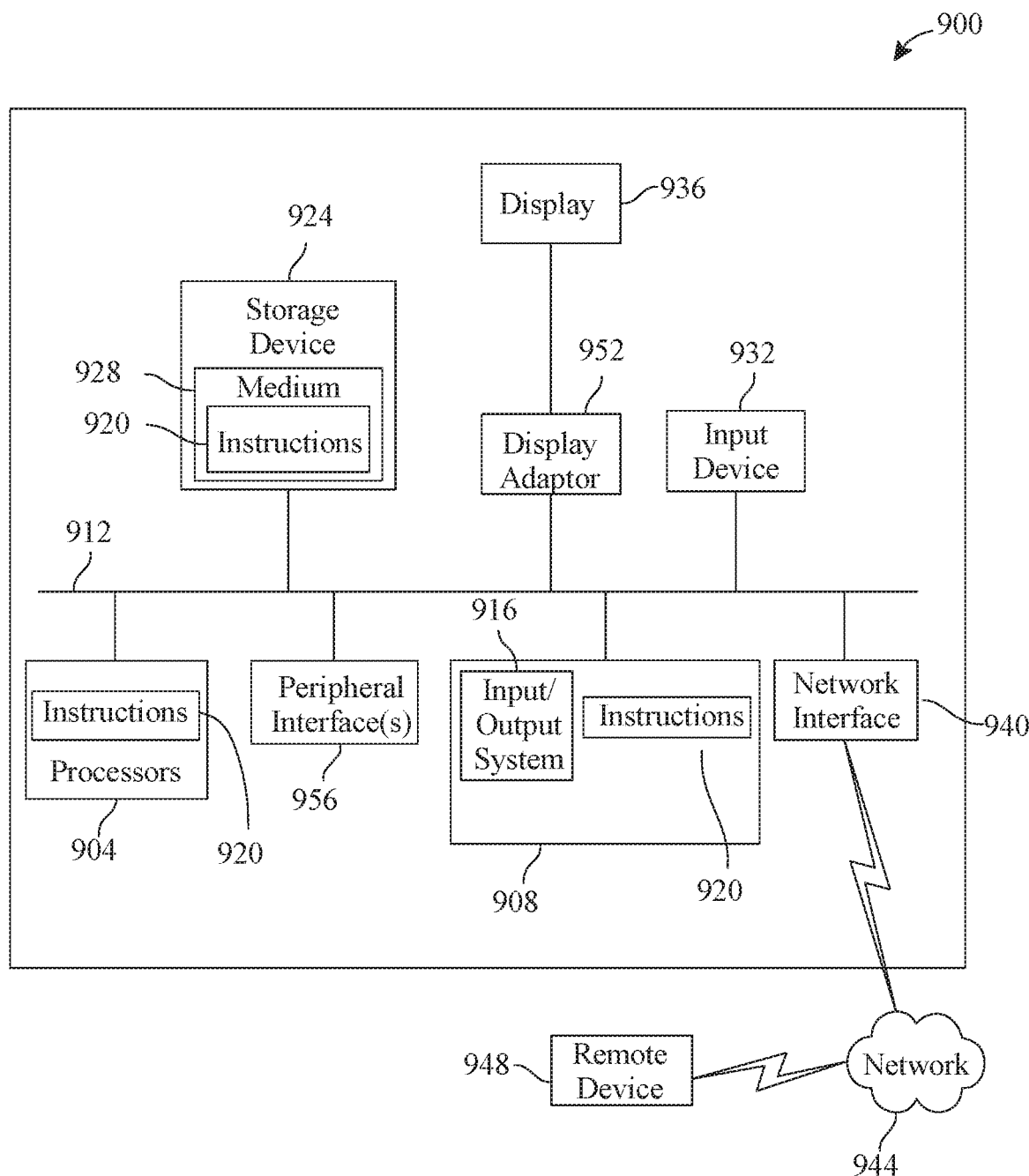
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An aircraft convertible between fixed-wing and hovering orientations, the aircraft comprising:
   a fuselage;
   a main wing pair comprising two opposing wings attached to the fuselage, wherein each wing of the two opposing wings comprises:
      a fixed wing section attached to the fuselage; and
      a movable wing section rotatably mounted to the fixed wing section;
   at least a first propulsor mounted to the movable wing section of each of the two opposing wings; and
   at least a first rotation mechanism attached to the fixed wing section and movable wing section of each of the two opposing wings, the at least a first rotation mechanism configured to rotate the movable wing section between a first movable wing section position parallel to the fixed wing section and a second movable wing section position perpendicular to the fixed wing section, wherein each rotation mechanism of the at least a first rotation mechanism further comprises a servo motor mounted in the fixed wing section, the servo motor acting to induce rotation of a servo motor shaft, wherein the servo motor shaft is offset from an axis of rotation of the movable wing section; and
   at least a first shaft-constraint mechanism disposed within the movable wing section of each of the two opposing wings and coupled to a distal end of a shaft extending from the fixed wing section to the movable wing section, each first shaft-constraint mechanism configured to allow the movable wing section to rotate, wherein the first shaft-constraint mechanism further comprises:
- at least a washer to generate a recoil force to urge the movable section against the fixed win section; and
- a shaft clamp installed at the movable wing section of each of the two opposing wings, wherein each of the shaft clamps are secured by a bearing set in a structural rib.

2. The aircraft of claim 1, wherein the at least a first propulsor further comprises a brushless motor driving at least a propeller.

3. The aircraft of claim 1, wherein each rotation mechanism of the at least a first rotation mechanism further comprises an actuator mechanically coupling the servo motor shaft to the movable wing section.

4. The aircraft of claim 3, wherein the actuator further comprises a belt and pulley mechanism.

5. The aircraft of claim 3, wherein the actuator further comprises a first gear affixed to the servo motor shaft and a second gear affixed to the movable wing, wherein the first gear is coupled to the second gear.

6. The aircraft of claim 3, further comprising at least a motor weight balance coupled to the at least a first rotation mechanism to reduce torque.

7. The aircraft of claim 1, wherein:
- the at least a first propulsor thrusts rearward with respect to the fuselage when the movable wing section is in the first movable wing section position; and
- the at least a first propulsor thrusts downward with respect to the fuselage when the movable wing section is in the second movable wing section position.

8. The aircraft of claim 7, wherein each rotation mechanism of the at least a first rotation mechanism is further configured to rotate the movable wing section to a third movable wing section position intermediate between the first moveable wing section position and the second movable wing section position.

9. The aircraft of claim 7 further comprising:
- two opposing canards, each canard of the two opposing canards rotatable-attached to the fuselage; and
- at least a second rotation mechanism attached to each canard and to the fuselage, wherein the at least a second rotation mechanism is configured to rotate each canard between a first canard position parallel to the first movable wing section position and a third canard position parallel to the third movable wing section position.

10. The aircraft of claim 9, wherein the aircraft is configured to engage in hovering flight while the movable wing sections are in the third movable wing second position and the canards are in the third canard position.

11. The aircraft of claim 1 further comprising two opposing canards, each canard of the two opposing canards rotatably attached to the fuselage.

12. The aircraft of claim 11 further comprising at least a second propulsor with at least a brushless motor driving at least a second propeller mounted to each of the two opposing canards.

13. The aircraft of claim 11, further comprising at least a second rotation mechanism attached to each canard and to the fuselage, wherein the at least a second rotation mechanism is configured to rotate each canard between a first canard position parallel to the first movable wing section position and a second canard position parallel to the second movable wing section position.

14. The aircraft of claim 11, wherein each rotation mechanism of at least a second rotation mechanism further comprises:
- a second servo motor mounted in the fuselage, the second servo motor acting to induce rotation of a second servo motor shaft offset from an axis of rotation of a canard of the two opposing canards; and
- an actuator mechanically coupling the second servo motor shaft to the canard.

15. The aircraft of claim 14, wherein the actuator further comprises a belt and pulley mechanism.

16. The aircraft of claim 14, wherein the actuator further comprises a first gear affixed to the second servo motor shaft and a second gear affixed to the canard, wherein the first gear is coupled to the second gear.

17. The aircraft of claim 14 further comprising at least a motor weight balance coupled to the at least a second rotation mechanism to reduce torque.

18. The aircraft of claim 11 further comprising at least a root structural rib coupled to at least a tip structural rib via the at least a canard and an at least a shaft.

* * * * *